United States Patent
Choudhury et al.

(10) Patent No.: US 8,150,665 B2
(45) Date of Patent: Apr. 3, 2012

(54) REQUIREMENTS MANAGEMENT AND MODELING IN COMPLEX SYSTEMS INTEGRATION

(75) Inventors: Chandrajit Choudhury, Silchar (IN); Kumar Mani, Maywood, NJ (US); Purushothaman Kunnath Narayanan, Bangalore (IN); Senthil Kumar Thiagarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/398,430

(22) Filed: Mar. 5, 2009

(65) Prior Publication Data

US 2010/0228529 A1 Sep. 9, 2010

(51) Int. Cl.
G06G 7/48 (2006.01)
G06F 9/44 (2006.01)
(52) U.S. Cl. .......................................... 703/6; 717/106
(58) Field of Classification Search .................. 703/6, 2; 717/106
See application file for complete search history.

(56) References Cited

U.S. PATENT DOCUMENTS

| | | | |
|---|---|---|---|
| 6,983,227 B1 * | 1/2006 | Thalhammer-Reyero | 703/2 |
| 7,236,940 B2 | 6/2007 | Chappel | |
| 2003/0046130 A1 | 3/2003 | Golightly et al. | |
| 2003/0149603 A1 * | 8/2003 | Ferguson et al. | 705/7 |
| 2006/0106656 A1 * | 5/2006 | Ouimet | 705/7 |
| 2006/0184412 A1 | 8/2006 | Kagan et al. | |
| 2006/0265257 A1 * | 11/2006 | Pulfer | 705/7 |
| 2008/0235611 A1 * | 9/2008 | Fraley et al. | 715/772 |
| 2009/0106749 A1 * | 4/2009 | Daum et al. | 717/168 |

OTHER PUBLICATIONS

Jennings, Nicholas R., "An Agent-Based Approach for Building Complex Software Systems", Apr. 2001, Communications of the ACM, vol. 44, No. 4.*

* cited by examiner

Primary Examiner — Paul Rodriguez
Assistant Examiner — Cedric D Johnson
(74) Attorney, Agent, or Firm — Patrick J. Daugherty; Driggs, Hogg, Daugherty & Del Zoppo Co., LPA

(57) ABSTRACT

A method and product for modeling and managing requirements in a complex integrated system, which comprises creating a set of requirements which can be implemented within all the components of the complex integrated system. Each requirement may be characterized as a point on the circumference of a circle, the characterization being an assignment of a requirement type. This type determines which circle the point will be located on, assigning a unique immutable numerical value to each requirement that determines in which order the point is placed on the previously determined circle. A location is also determined for each requirement. The location may determine the position of the requirement in relation to other requirements on the circumference of one of the set of circles. Sectors are also formed within the set of circles, as a function of a set of architectural principles and interfaces are identified between points, represented as chords.

16 Claims, 7 Drawing Sheets

REQUIREMENTS MANAGEMENT AND MODELING IN COMPLEX SYSTEMS INTEGRATION

FIELD OF THE INVENTION

The present invention generally describes a system and method to aid a complex systems architect in delivering complex systems integration engagements through a non-linear model of requirements, which simultaneously establishes traceability, identifies all interfaces, and identifies an optimal set of interfaces. The method also defines and updates requirement numbering and visually displays traceability among requirements and interfaces.

BACKGROUND OF THE INVENTION

Complex systems integration involves the development, interconnection, and integration of many different kinds of hardware and software which work together in a cooperative fashion to solve complex business problems (i.e. form heterogeneous systems). There may be many different representations of data in a heterogeneous system, for example, different representations for integers, byte streams, floating point numbers, and character sets. Most of this type of data can be marshaled from one system to another without losing significance.

Some components in the distributed system may have different capabilities than other components, generally including faster clock cycles, larger memory capacity, bigger disk farms, printers and other peripherals, and different services. Different instruction sets may also exist between systems. An application compiled for one instruction set cannot be easily run on a computer with another instruction set unless an instruction set interpreter is provided.

When it comes to solving business problems, heterogeneous systems have to deal with a large number of business requirements, which are defined as specifications of what a business wants, the purposes for initializing a specific project, what the needed achievements for the project will be, and the quality measures for the project. These requirements are generally expressed in terms of broad outcomes rather than specific functions that a system may perform. Other types of requirements comprise functional requirements and component requirements. Specific design elements are generally outside the scope of a requirement, although design standards may be referenced if needed.

Business requirements may be traced through each stage of progress by a traceability matrix, which is an example of a cross matrix. High level concepts are matched to scope items which will map to individual requirements, and the individual requirements will map to corresponding functions. This matrix should also take into account any changes in scope during the life of the project. At the end of the project, this matrix should show each function built into a system, its source and the reason that any stated requirements may not have been delivered.

Traditional requirements management and system traceability matrices generally involve a linear model for traceability and emphasize discipline and rigor as they descend down the levels of requirements. The linear model works well for some software development projects, but suffers from significant limitations when applied to complex system integration projects. The linear model scales poorly for these systems, especially where there are thousands of requirements. In general, interfaces within the systems are absent or not handled at a level that supports a cogent high-level view (e.g. unable to indicate how the system supports a high level business capability). Also, the linear model is unable to systematically translate high level capabilities to the systems and interfaces that must work in concert to realize them. This results in either a glut of requirements at the front end of a traceability matrix or an unmanageable profusion of technical statements at the lower levels of the traceability matrix.

Thus, there is a need for improved methods and systems that address the above problems, as well as others.

SUMMARY OF THE INVENTION

A method and product are provided for modeling and managing requirements in a complex integrated system. The method comprises creating a set of requirements which can be implemented within all the components of the complex integrated system. For some embodiments, each requirement is characterized as a point on the circumference of a circle, this characterization comprising assigning a requirement type to each requirement in the set of requirements. In other embodiments, the requirement type determines which circle the point will be located on, assigning a unique numerical value to each requirement in the set of requirements. For other embodiments, the numerical value is immutable and determines in which order the point is placed on the previously determined circle.

The method also comprises determining a location for each requirement in the set of requirements. For some embodiments, the location determines the position of the requirement in relation to other requirements on the circumference of one of the set of circles. The method may also comprise forming sectors within each of the set of circles. In other embodiments each sector is determined as a function of a set of architectural principles; and identifying interfaces between points, where interfaces are represented as chords between points.

In another aspect, methods are provided for deploying a service delivering complex systems integration engagements through a non-linear model of requirements, for example by a service provider who offers to implement, deploy, and/or perform functions for others. Still further, an article of manufacture comprising a computer usable storage medium having a computer readable program in said medium may be provided. Such program code comprises instructions which, when executed on a computer system, cause the computer system to perform one or more method and/or process elements for changing project length based on fuzzy logic techniques, for example as described above. Moreover, systems, articles and programmable devices configured for performing one or more method and/or process elements of the current invention for recycling a material as a function of interactively determining an appropriate category, for example as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
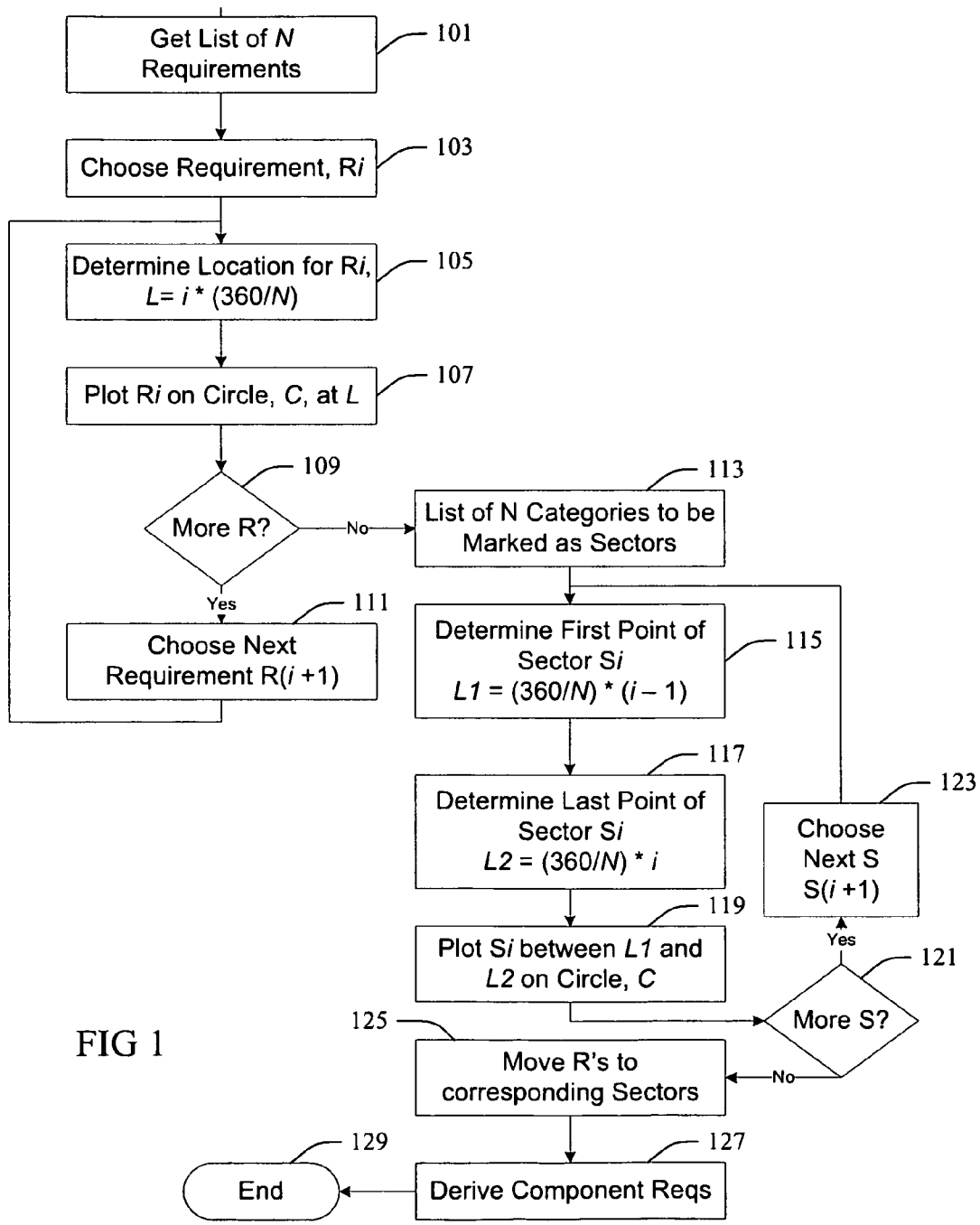
FIG. 1 is a flow chart illustrating one embodiment for modeling requirements in a circular fashion.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation
I. General Description Systems architects who lead business projects involving complex systems integration face several challenges, including but not limited to: having to deal with a large number of business requirements, where these requirements span multiple systems; being able to efficiently identify and manage the interfaces and interconnects between systems; quickly and precisely tracing requirement characteristics (e.g. scope, impact, and coverage); and executing and delivering the projects within the generally familiar business constraints of time, budget, resource allocation, and projected profit. It should be noted that complex systems integration in this context differs from traditional product development in that complex systems integration achieves business outcomes by integrating several existing systems or by replacing a subset of systems with a new system. Conceptualization and design are very critical for a project involved in complex systems integration, even though it may feature less code development as compared to traditional product development because the systems are generally already existing prior to integration.

The non-linear model addresses these challenges faced by systems architects by creating system scalability and interface management as well as providing traceability. It provides an effective and precise view of the key requirements characteristics while also providing a visual categorization of requirements in two categories: functionality and technicality. The non-linear model also dynamically adapts to conditions like implementation decision change, but still maintaining requirements traceability. Lastly, the model accommodates any number of requirements (limited only by platform and available storage constraints) at each level of each type, making the model suitable for large complex projects.

FIG. 1 illustrates one embodiment of the non-linear model, representing the requirements in a circular fashion. Generally, every requirement is plotted as a point on a circle, with different requirement types being represented by different circles, drawn one below the other. Each point is characterized by type of requirement, given a unique number and a location. Business requirements may be represented by a prefix, for example, BR; functional requirements may also be represented by a prefix, such as FR; while the component requirements may be represented with a prefix such as CR.

The unique number assigned to a point never changes and has no relation with the component/system with which a requirement is categorized. This number is assigned incrementally on adding a new requirement in a type, for example, BR/FR/CMP. The circumferential location of a requirement point represents its location plotted in a given circle. The locations starts from 0° 0' 0" (i.e. zero degrees, zero minutes, zero seconds) to 360° 0' 0" (i.e. three hundred sixty degrees, zero minutes, zero seconds).

At 101, a set of requirements is acquired and this set of requirements is characterized with each of a requirement type and a unique number. This listing may include any number and/or types of requirements. For some embodiments, this listing will generally include business requirements (BR) and functional requirements (CR). At 103, the first requirement, $R_i$ is chosen. Using the non-linear model, requirements will generally be plotted in the order in which they are listed, for example, in the order of the unique, unchangeable number assigned to each requirement. These locations may change based on the demands of the project, and this change is considered within the model.

At 105, the location at which $R_i$ is to be plotted is determined using the formula:

$$L = i*(360/N) \qquad \text{(Equation 1)}$$

Following this equation, the initial location assigned to $R_i$ is based upon the number of requirements within a list.

At 107, using the location determined by Equation 1, $R_i$ is plotted on a circle, C, based on the type of requirement as described above. For example, business requirements (BR) will be plotted on one circle and functional requirements (FR), also known as system requirements, will be plotted on a second circle located directly below the circle containing the BR. At 109, a determination is made whether more requirements require plotting. If more requirements need to still be plotted from the original list N, then the next requirement $R_{(i+1)}$ is chosen at 111 and a new location determination applying Equation 1 is made at 105 for each of the remaining requirements. Since for some embodiments requirements are initially allocated based on their unique identifiers i, their locations will be equally separated along the circumference of a given circle. In additional embodiments, the circles may be extended to include test cases, data requirements, and error conditions.

After the initial circular models are made, requirements are classified into functional sectors. Functional sectors are then identified applying architectural principles at 113, and are drawn as sectors in a next circle below the circle containing the functional requirements (FR). Architectural principles are general rules and guidelines for use and deployment of resources and assets for a particular organization or project. These types of principles are generally chosen to ensure alignment of an organization's business strategies and individual project strategies. These principles may be influenced by many factors, for example, the strengths and weaknesses of an enterprise, market factors, and current systems and technology resources available within an enterprise. Though architectural principles determine how many and what types of sectors will exist for a given model, the locations of the sectors within the model are determined as described below.

At 115 and 117 the first and last point for a sector $S_i$ are determined using the following equations:

$$L_1 = (360/N)*(i-1) \quad \text{(Equation 2)}$$

$$L_2 = (360/N)*i \quad \text{(Equation 3)}$$

At 119, $S_i$ is plotted between the determined locations of $L_1$ and $L_2$ within the circle. If multiple sectors require plotting, the existence of another sector is determined at 121. If further plotting is required, the next S value is chosen at 123, and a next sector location determination is made starting at 115. If no further sectors require plotting, all plotted requirements are moved to their corresponding new sectors at 125, and component requirements are derived for each sector 127. The system thereafter ends at 129. Moving requirements to their corresponding sectors and to add additional requirements is discussed in relation to FIG. 2.

Figure 2A:
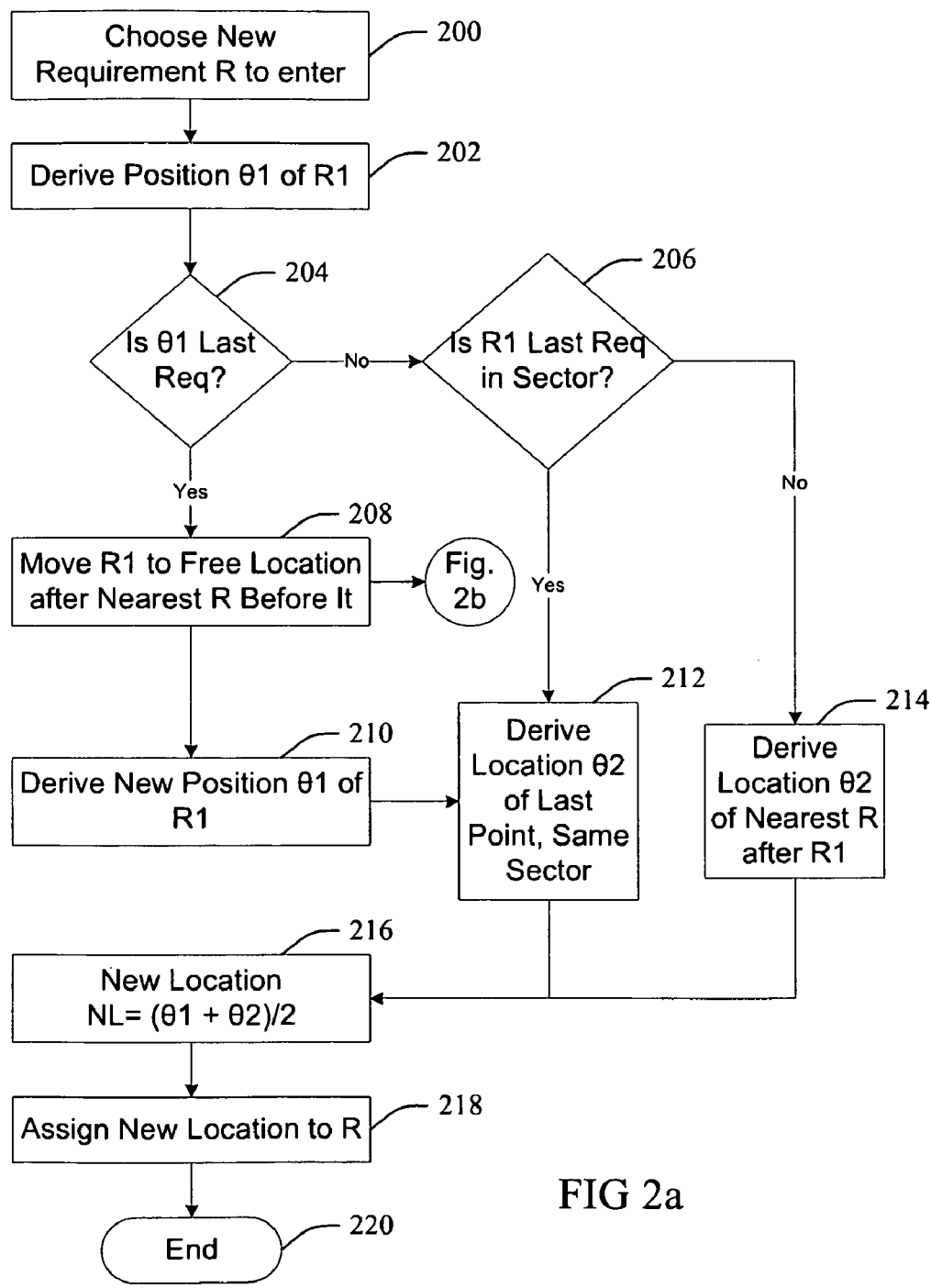
FIG. 2 is a flow chart illustrating one embodiment for moving a requirement.
Figure 2B:
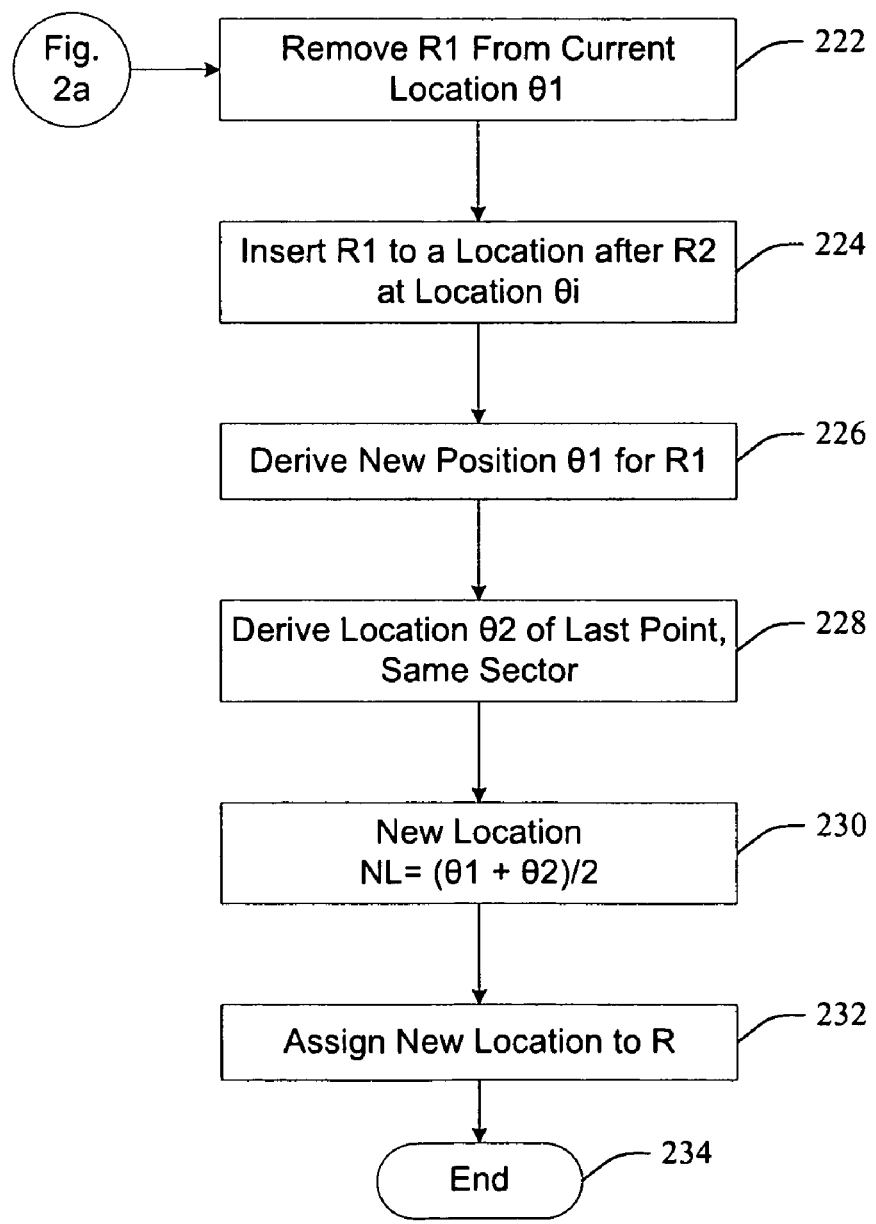

The non-linear model is supported by a robust and flexible method to manage change. The number of a requirement, which is immutable, and the location of the requirement, which is mutable, are separate. When a new requirement is added, a unique number is assigned to the requirement. A requirement retains this unique number throughout the model, even if the requirement changes locations multiple times, which may happen often during a complex systems integration engagement. FIG. 2a illustrates a method for which a new requirement may be added into a new location within the model. FIG. 2b illustrates a method for which an existing requirement may be moved to a new location within the model.

For some embodiments, a prerequisite for new requirements may include the requirement going to a specified location, for example, it must follow a specific requirement. For example, in FIG. 2 at 200, a new requirement R is chosen. The position of an existing requirement, for example, $R_1$, is determined at 202. This position is given the designation $\theta 1$ for purposes of example.

At 204, a determination is made whether or not the location $\theta 1$ is the last available location within a sector, in particular, at 204 it is determined whether $\theta 1$ represents the last requirement in a sector. If $\theta 1$ is not the last available location, the new requirement will be assigned to a location which is the midpoint of the arc separating the requirement $R_1$ and the next nearest point. First, a determination must be made at 206 whether the next nearest point is another requirement point or the end of a sector. If the next nearest point is not the end of a sector at 206, the location of the next nearest point $\theta 2$ is derived at 214. If $R_1$ is the last requirement in a sector, R is placed at the midpoint of the arc separating $R_1$ and the end of the sector at 212, with $\theta 2$ being the location of the last point (e.g. $L_2$ as determined by Equation 3) within a sector.

If there is no space after $R_1$ in the same sector found at 204, $R_1$ is moved to another free location at 208. This free location may or may not be a valid permanent location for $R_1$, for example, the location may be in the wrong sector or located on a different circle. $R_1$ remains in this free location until a new location of $R_1$ can be derived at 210. The new location is determined at 210 using a midpoint between two locations. The midpoint of two points is obtained by finding the mean of the location values of the points, by deriving a location $\theta 2$ at 212, as discussed previously. The new location is calculated at 216 using the derived values of $\theta 1$ and $\theta 2$. The new location is thereafter assigned to R at 218 and the system ends at 220.

In additional embodiments, moving a requirement from a current location to a newly derived requirement may require the existing embodiment to move to a specific location. For example, in FIG. 2b at 222 $R_1$ is removed from its current location. At 224, $R_1$ is moved to a free location. As described earlier, this free location may or may not be a valid location for $R_1$, for example, the location may be located on a different circle or in a wrong sector. $R_1$ remains in this free location until a new location of $R_1$ can be derived at 226.

A new location is determined using a midpoint between two locations. The midpoint of two points is obtained by finding the mean of the location values of the points, by deriving a location $\theta 2$ at 228. The $\theta 2$ found at 228 will be located within a sector that is appropriate for $R_1$. $\theta 1$ and $\theta 2$ will be used at 230 to calculate a new location. If, as discussed with regard to FIG. 2a, $R_1$ is the last requirement in a sector, R is placed at the midpoint of the arc separating $R_1$ and the end of the sector, with $\theta 2$ being the location of the last point (e.g. $L_2$ as determined by Equation 3) within a sector. The requirement is then assigned to the new location at 232 and the system ends at 234.

Figure 3:
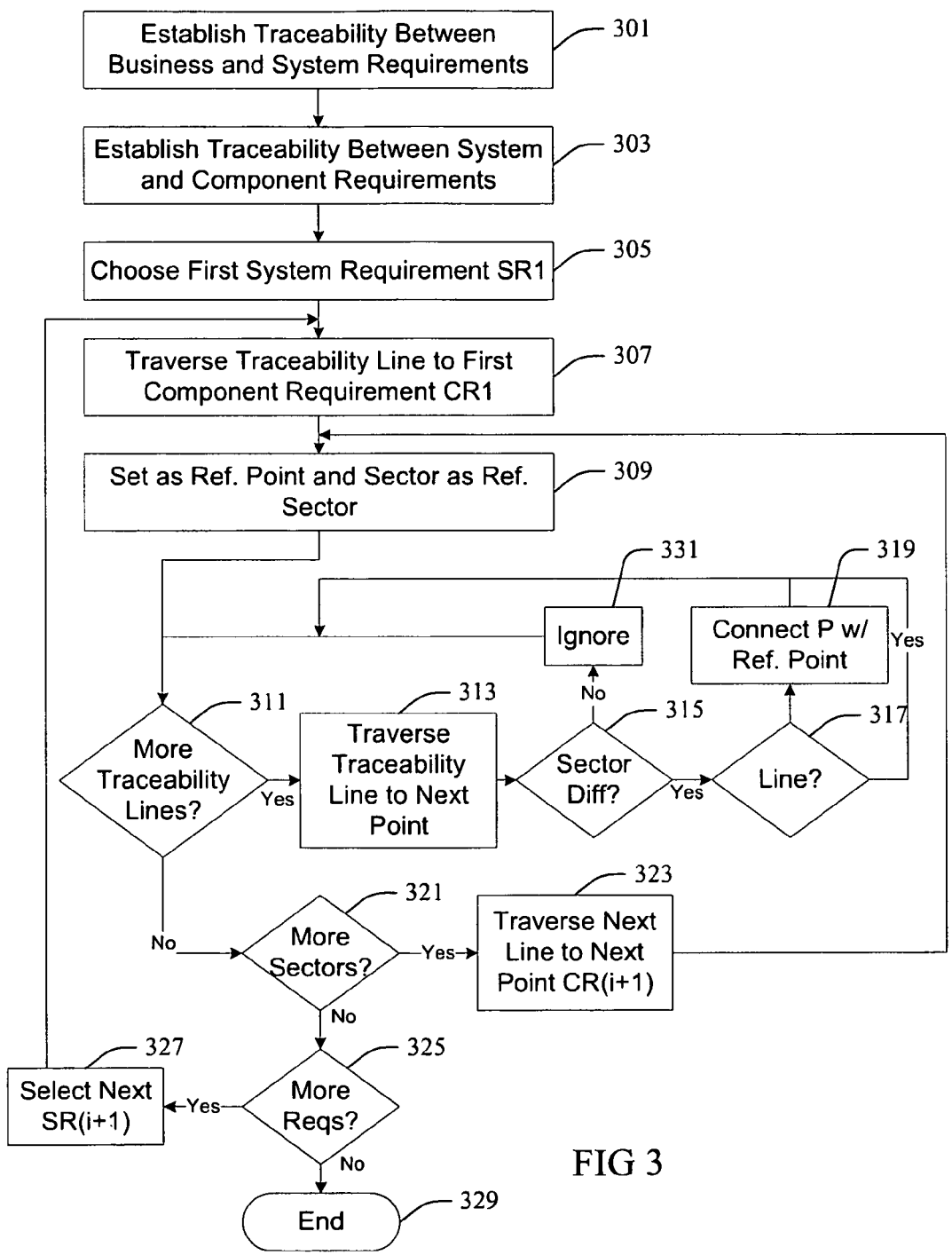
FIG. 3 is a flow chart illustrating one embodiment for interface identification.

Once the requirements model is established, interfaces are identified and consolidated. FIG. 3 illustrates one embodiment for determining interfaces within the non-linear model. This method starts with establishing traceability between business and functional, also known as system, requirements at 301. Establishing traceability for some embodiments involves drawing patterned chords between requirements according to the following rules: both points should be derived from the same parent system, the points should be in two different sectors in a circle and the same pattern should be used if a chord already exists between the sectors getting connected. Traceability should also be established between the system requirements and the derived component requirements at 303.

A first system requirement $SR_1$ is chosen at 305 and the first traceability line connected with $SR_1$ is traversed to a first Component Requirement $CR_1$ at 307. When traversing is applied at one level (e.g. business requirements), a systems architect can explain how a business transaction flows through the functioning sectors of the organization and when traversing is applied between levels, it clearly identifies the system(s) that support a business transaction. At 309, $CR_1$ is set as a reference point and the sector containing $CR_1$ is set as a reference sector.

At 311 it is determined whether more traceability lines exist for the system requirement point $SR_1$. If lines do exist at 311, the next traceability line is traversed at 313. A determination is then made at 315 if the next component requirement, for example purposes, $CR_2$ is in a sector different from $CR_1$. If not, the traceability line connecting $SR_1$ and $CR_2$ is marked as "Ignore" at 331. If at 315 a different sector is found, another determination is made at 317 whether a line between the reference sector and this new sector exists. If a line already exists at 317, then a determination is made whether or not more traceability lines exist at 311. If a line does not already exist, a line is drawn connecting the reference point at 319. This line represents an interface. Every interface should be represented by a chord with a distinct pattern. Interfaces can be identified and consolidated by applying architectural principles directly or indirectly.

If no traceability lines continue to exist at 311, a determination is made at 321 whether there are any sectors left that have not been made a reference sector. If sectors exist, the next traceability line not marked as "Ignore" is traversed at 323 to the next point, and new reference point and reference sector are designated at 309. If no more sectors remain, a determination is made at 325 whether any system requirements remain that have not been connected by an interface chord or within a sector that does not contain an interface connection. If requirements exist at 325, the next system requirement $SR_{(i+1)}$ is selected at 327, and a traceability line from $SR_{(i+1)}$ is traversed to a component requirement $CR_i$ at 307. If no requirements remain, the model ends at 329.

In some embodiments, consolidation of interface connections may occur where multiple interfaces exist between sectors or individual requirements. This consolidation may allow a systems architect to simplify an already complex integration by allowing multiple avenues of traceability to be accounted for by a single set of data or requirements, for example, multiple interfaces between an order manager and a storage warehouse may be represented as a single line within the model instead of multiple lines.

Figure 4:
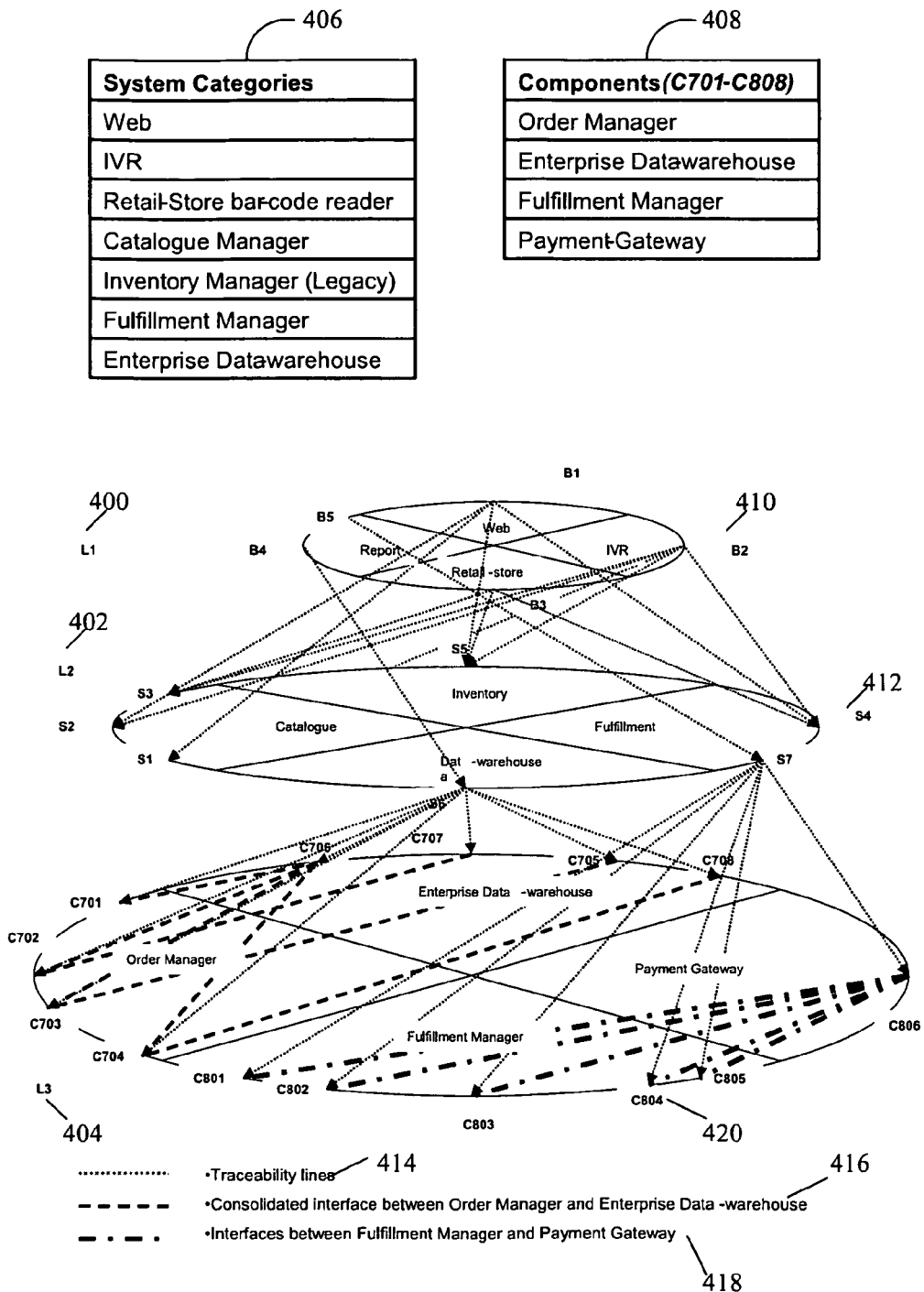
FIG. 4 is a diagram illustrating one embodiment for an integrated system incorporating modeling requirements in a circular fashion, moving requirements, and identifying interfaces.

FIG. 4 depicts one embodiment for an integrated system incorporating modeling requirements in a circular fashion, moving requirements, and identifying interfaces. In FIG. 4, three levels of requirements exist. The first level, L1 400, which includes business requirements B1-B5 410 (with only B2 labeled to simplify the depiction). These business requirements are generally created and/or obtained by a systems architect and set the general parameters for a given project. These business requirements 410 should encompass every aspect of for a project, for example, the technology processes being implemented as well as the design and business constraints the project must be completed under. These business requirements 410 are also subject to change as the project progresses through the production process.

Level two, L2 402, includes system requirements S1-S7 412 (with only S4 labeled to further simplify the depiction). The systems requirements 412 include all aspects of the limitations and requirements of the existing systems integrated into a complex system or the new system subset that has replaced existing apparatus within a complex system.

Level three, L3 404, includes component requirements C701-C808 420 (with only C808 labeled to further simplify the depiction) which are derived from the system requirements 412. The component requirements 420 include aspects of the separate production entities that are required to complete a given project, for example, for implementation of a project an enterprise's resources need be allocated to individual creators, design architects, and manufacturing facilities. Functional Sectors 406 and 408 are also drawn into the system and labeled, with name listings within tables 406 and 408. These functional sectors 406 are identified using architectural principles and allow for ease in creation of interfaces between components as well as consolidation of these interfaces for simplified modeling.

Traceability lines 414 are drawn following the method illustrated in FIG. 3, with the lines 414 represented as light dashed lines. The traceability lines 414 are traversed to find corresponding component requirements 420 and interfaces 418 are created, also according to the method demonstrated in FIG. 3 and represented as dash-dot-dash lines. Lastly, interfaces are shown consolidated 416 by bold dashed lines.

Figure 7:
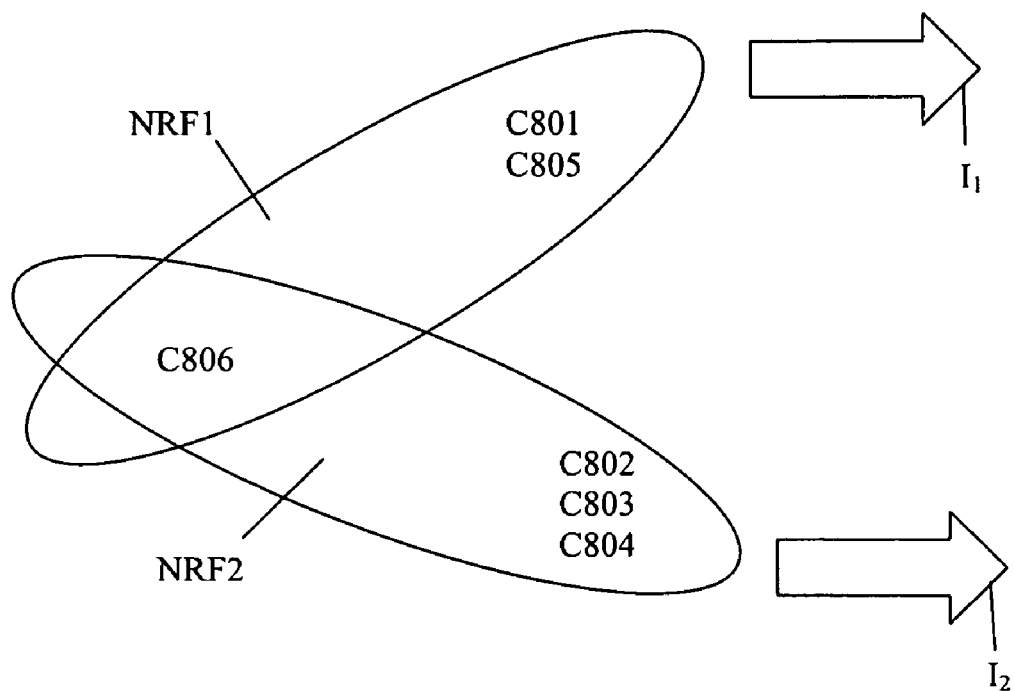
FIG. 7 is a diagram illustrating one embodiment for applying the interface consolidation technique to arrive at an optimal set of interfaces.

FIG. 7 illustrates one example of applying an interface consolidation technique to arrive at an optimal set of interfaces, for example, like those depicted in FIG. 4. This interface consolidation technique is employed to reduce the number of interfaces. In FIG. 7, a set of interfaces between a Payment Gateway and a Fulfillment Manager are represented. For this example, the System Requirement S7 (i.e., reference numeral 412) as depicted in FIG. 4 is the originating requirement.

One interface is created between the Payment Gateway and the Fulfillment Manager based on a known rule. This rule may recite, for example, that the interface is necessary where the requirements originate from the same system requirement and end in two different sectors. Since all the requirements originate from S7 in this representation and the interface ends in two different sectors, an interface may be created. As such, the interfaces between the Payment Gateway and the Fulfillment Manager are consolidated from five interfaces down to one interface.

Thereafter, the non-functional requirements and the component requirements, are applied to identify whether the level of consolidation performed (i.e., consolidating the five interfaces into one interface) is appropriate. In this example, the two non-functional requirements are NFR1 and NRF2. Here, NRF1 represents the requirement that the immediate transaction is applicable to the component requirements C801, C805. NFR2 represents the requirement that the "Batch Mode" transaction is applicable for the component requirements C802, C803, C804. The component requirements may represent any number of attributes, for example, C801 may signify sending XML/FTP credit card payments using the Payment Gateway+NRF1 and C802 may denote sending XML/FTP credit card payments to CCH gateway using Payment Gateway+NRF2. Each requirement C803-C806 may correspond to a number of payment methods, including debit card payment and one-time payment, as well as the fulfillment of the payment request.

Determining if the appropriate level of consolidation has occurred may include the identification of situations where consolidation to a single interface may not be appropriate, for example, requirements C801 and C805 require the transaction to be performed immediately, which necessitates application of NRF1. Requirements C802, C803 and C804, on the other hand, dictate that the transaction always be batch-mode, which needs the application of NRF2. For the same business functionality to occur (e.g. fulfillment management) in two technical aspects (e.g., batch mode and immediate), two different interfaces must be introduced instead only a single interface. Here, NRF1 and NRF2 are applied to separate the consolidated interface. Two interfaces I1 and I2 may thereafter be identified between Fulfillment Manager and Payment Gateway components.

Figure 5:
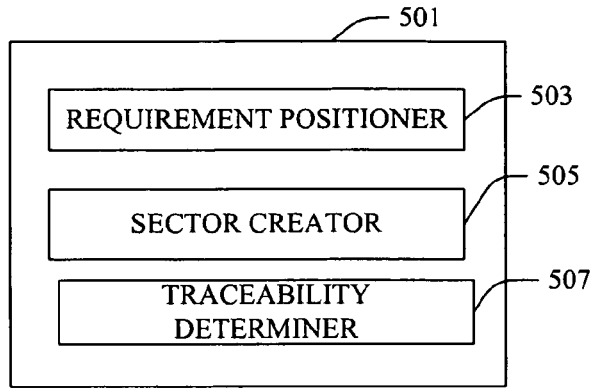
FIG. 5 is a block diagram illustrating a system or device which simultaneously establishes traceability, identifies all interfaces, and identifies an optimal set of interfaces.

FIG. 5 exemplifies one embodiment of a Complex Systems Integrator 501 according to the present invention, comprising: a Requirement Positioner 503, a Sector Creator 505, and a Traceability Determiner 507.

The Requirement Positioner 503 comprises logic components configured to determine the exact position for all requirements, for example, those input into the system and those derived from those input into the system. The positioner 503 accomplishes the determination by following methods and Equation 1 as described above with regards to FIG. 1. The equation is a function of the determination of a midpoint between two locations, obtained by finding the mean of the location values.

The Requirement Positioner 503 also comprises logic components configured to move requirements from existing positions to new positions, based on the addition or reconfiguration of requirements. New points are added and existing points are moved by the positioner 503 based on methods and Equations 2 and 3 as described above with regards to FIG. 2. Equations 2 and 3 are also functions of a determination of a midpoint between two locations, but allow for the use of multiple locations to find an appropriate position for a new or moved requirement. This aspect of the Requirement Positioner 503 is performed after sectors are created by the Sector Creator 505. The requirements are thereafter categorized by the Requirement Positioner 503 based on a categorization scheme which best suits an enterprise and a particular project.

The Sector Creator 505, on the other hand, comprises logic components configured to use the functional requirements input into the system to generate sectors for categorization. The Sector Creator 505 implements architectural principles to divide each existing level into categorical sectors. For example, as illustrated in FIG. 4 retail store, web, report, and catalog are a sample of the types of sectors that may be created based on the architectural principles implemented by an enterprise. Since the architectural principles may vary depending on the type of industry in which an enterprise is in, the Sector Creator 505 does not create a set number of sectors for each requirement level, but may include as many or as few sectors as necessary to properly execute the project.

Component requirements are also derived by the Sector Creator 505. The component requirements are determined as a function of the functional or system requirements. The creator 505 derives these requirements as described with regards to FIG. 4.

Lastly, the Traceability Determiner 507 comprises logic components configured to establish traceability and interface connections between requirements and levels as described above with regards to FIG. 4. The determiner 507 implements logic components which configure distinct and individualized chords between points within the system which necessitate interfaces, for example, communications pathways or manufacturing resource distribution pathways.

The determiner 507 also comprises logic components which are configured to notify a user of changes within the model, for example, through a visual display or through forms dynamic modeling apparatus.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of the figures, including FIGS. 1 through 5 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 1 through 3 and 5, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
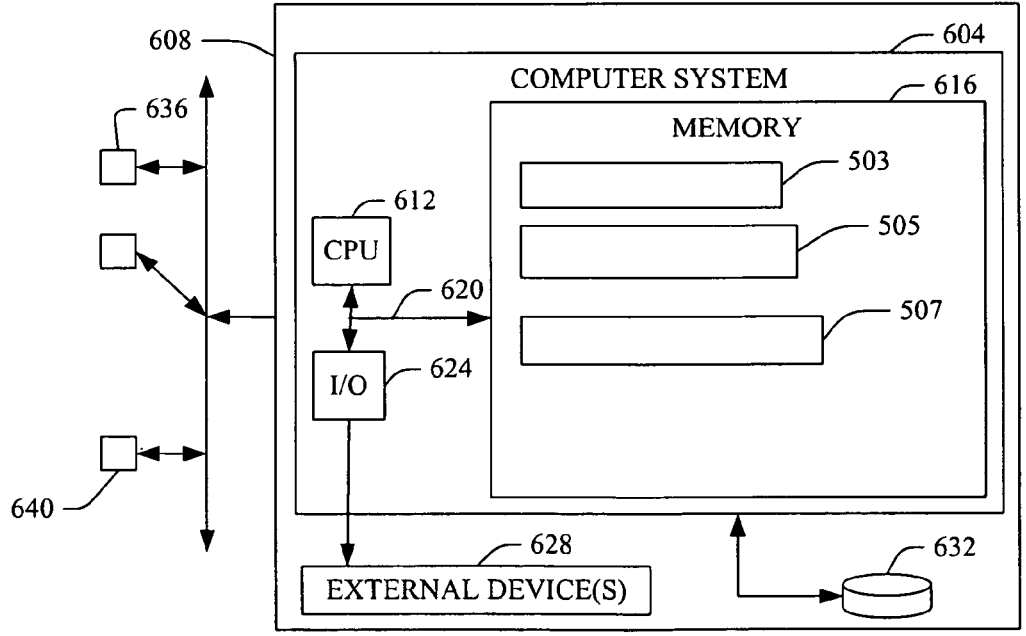
FIG. 6 is a block diagram illustrating an exemplary computerized implementation of a process and system which simultaneously establishes traceability, identifies all interfaces, and identifies an optimal set of interfaces.

Referring now to FIG. 6, an exemplary computerized implementation includes a computer system 604 deployed within a computer infrastructure 608 such as a computer or a programmable device such as a personal digital assistant (PDA) or cellular phone. This is intended to demonstrate, among other things, that the present invention could be implemented within a network environment 640 (e.g., the Internet, a wide area network (WAN), a local area network (LAN), a virtual private network (VPN), etc.) in communication with one or more additional computers 636, or on a stand-alone computer infrastructure 608. In the case of the former, communication throughout the network 640 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 604 includes a central processing unit (CPU) 612, a memory 616, a bus 620, and input/output (I/O) interfaces 624. Further, the computer system 604 is shown in communication with external I/O devices/resources 628 and storage system 632. In general, the processing unit 612 executes computer program code, such as the code to implement various components of the process and system for implementing complex system integration by a non-linear model as illustrated in FIGS. 1 through 3 and 5, and described above, for example including the Requirement Positioner 503, the Sector Creator 505, and the Traceability Determiner 507 components discussed above, which are stored in memory 616 and/or storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, the computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604.

Still yet, computer infrastructure 608 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 608 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 608, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 604, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for modeling and managing requirements in a complex integrated system, comprising:
    characterizing via a processing unit each requirement in a set of a plurality of requirements implementable within a plurality of components of a complex integrated system as a unique numerical point value;
    assigning via the processing unit a requirement type from a set of first, second and third requirement types to each requirement in the set of requirements, wherein each of the first, second and third requirement types are different from each other;
    plotting via the processing unit each of the first type requirement unique numerical point values at spaced locations within one of a plurality of functional sector portions formed on a circumference of a first requirement type circle, each of the second type requirement unique numerical point values at spaced locations within one of a plurality of functional sector portions formed on a circumference of a second requirement type circle that is graphically displayed below the first circle, and each of the third type requirement unique numerical point values at spaced locations within one of a plurality of functional sector portions formed on a circumference of a third requirement type circle that is graphically displayed below the second and forms a column with the first and second circles, wherein each functional sector is determined as a function of a set of architectural principles; and
    drawing via the processing unit chords between unique numerical point values located on different ones of the first, second and third circles of requirements that are derived from a same parent system, the drawing further using any chord already existing and connecting the same functional sector portions of the different ones of the first, second and third circles.

2. The method of claim 1, wherein plotting each of the requirement unique numerical point values on the first, second and third requirement type circles further comprises:
    plotting each of the first type requirement unique numerical point values at equally spaced locations along the circumference of the first requirement type circle, each of the second type requirement unique numerical point values at equally spaced locations on the circumference of the second requirement type circle, and each of the third type requirement unique numerical point values at equally spaced locations on the circumference of the third requirement type circle; and
    relocating a requirement unique numerical point value from an original plotted location to a new location within another formed functional sector portion that is more appropriate to the relocated requirement, wherein the new location is a mean between two plotted points in the another formed functional sector portion.

3. The method of claim 2, wherein forming sectors is a function of determining a first point for the sector and a last point for the sector, based on a total count of the set of requirements and a category count of a number of sections to be formed.

4. The method of claim 3, wherein one of the two plotted points is an already plotted requirement unique numerical point value, and an other of the two plotted points is the first point or the last point for the another formed functional sector portion.

5. A service for modeling and managing requirements in a complex integrated system, comprising:
    providing a computer infrastructure comprising a processing means, a memory in communication with the processing means and a network interface in communication with the processing means, wherein the processing means:
    characterizes each requirement in a set of a plurality of requirements implementable within a plurality of components of a complex integrated system as a unique numerical point value;
    assigns a requirement type from a set of first, second and third requirement types to each requirement in the set of requirements, wherein each of the first, second and third requirement types are different from each other;
    plots each of the first type requirement unique numerical point values at spaced locations within one of a plurality of functional sector portions formed on a circumference of a first requirement type circle, each of the second type requirement unique numerical point values at spaced locations within one of a plurality of functional sector portions formed on a circumference of a second requirement type circle that is graphically displayed below the first circle, and each of the third type requirement unique numerical point values at spaced locations within one of a plurality of functional sector portions formed on a circumference of a third requirement type circle that is graphically displayed below the second and forms a column with the first and second circles, wherein each functional sector is determined as a function of a set of architectural principles; and
    draws chords between unique numerical point values located on different ones of the first, second and third circles of requirements that are derived from a same parent system, wherein the chords are drawn by using any chord already existing and connecting the same functional sector portions of the different ones of the first, second and third circles.

6. The service of claim 5, wherein the processing means plots each of the requirement unique numerical point values on the first, second and third requirement type circles by:
    plotting each of the first type requirement unique numerical point values at equally spaced locations along the circumference of the first requirement type circle, each of the second type requirement unique numerical point values at equally spaced locations on the circumference of the second requirement type circle, and each of the third type requirement unique numerical point values at equally spaced locations on the circumference of the third requirement type circle; and
    relocating a requirement unique numerical point value from an original plotted location to a new location within another formed functional sector portion that is more appropriate to the relocated requirement, wherein the new location is a mean between two plotted points in the another formed functional sector portion.

7. The service method of claim 6, wherein the processing means forms the functional sectors as a function of determining a first point for the sector and a last point for the sector based on a total count of the set of requirements and a category count of a number of sections to be formed.

8. The service method of claim 7, wherein one of the two plotted points is an already plotted requirement unique numerical point value, and an other of the two plotted points is the first point or the last point for the another formed functional sector portion.

9. An article of manufacture, comprising:
a tangible computer readable storage device comprising computer executable program code stored thereon, the computer executable program code comprising instructions which, when executed on a computer system, cause the computer system to:
characterize each requirement in a set of a plurality of requirements implementable within a plurality of components of a complex integrated system as a unique numerical point value;
assign a requirement type from a set of first, second and third requirement types to each requirement in the set of requirements, wherein each of the first, second and third requirement types are different from each other;
plot each of the first type requirement unique numerical point values at spaced locations within one of a plurality of functional sector portions formed on a circumference of a first requirement type circle, each of the second type requirement unique numerical point values at spaced locations within one of a plurality of functional sector portions formed on a circumference of a second requirement type circle that is graphically displayed below the first circle, and each of the third type requirement unique numerical point values at spaced locations within one of a plurality of functional sector portions formed on a circumference of a third requirement type circle that is graphically displayed below the second and forms a column with the first and second circles, wherein each functional sector is determined as a function of a set of architectural principles; and
draw chords between unique numerical point values located on different ones of the first, second and third circles of requirements that are derived from a same parent system, the drawing further using any chord already existing and connecting the same functional sector portions of the different ones of the first, second and third circles.

10. The article of manufacture of claim 9, the computer executable program code comprising instructions, which when executed on the computer system, causes the defined computer system to plot each of the requirement unique numerical point values on the first, second and third requirement type circles by:
plotting each of the first type requirement unique numerical point values at equally spaced locations along the circumference of the first requirement type circle, each of the second type requirement unique numerical point values at equally spaced locations on the circumference of the second requirement type circle, and each of the third type requirement unique numerical point values at equally spaced locations on the circumference of the third requirement type circle; and
relocating a requirement unique numerical point value from an original plotted location to a new location within another formed functional sector portion that is more appropriate to the relocated requirement, wherein the new location is a mean between two plotted points in the another formed functional sector portion.

11. The article of manufacture of claim 10, the computer executable program code comprising instructions which, when executed on the computer system, causes the defined computer system to form sectors as a function of determining a first point for the sector and a last point for the sector based on a total count of the set of requirements and a category count of a number of sections to be formed.

12. The article of manufacture of claim 11, wherein one of the two plotted points is an already plotted requirement unique numerical point value, and an other of the two plotted points is the first point or the last point for the another formed functional sector portion.

13. A programmable complex integrated system comprising:
a processing means;
a memory in communication with the processing means; and
a network interface in communication with the processing means and the memory, wherein the processing means is configured to:
characterize each requirement in a set of a plurality of requirements implementable within a plurality of components of a complex integrated system as a unique numerical point value;
assign a requirement type from a set of first, second and third requirement types to each requirement in the set of requirements, wherein each of the first, second and third requirement types are different from each other;
plot each of the first type requirement unique numerical point values at spaced locations within one of a plurality of functional sector portions formed on a circumference of a first requirement type circle, each of the second type requirement unique numerical point values at spaced locations within one of a plurality of functional sector portions formed on a circumference of a second requirement type circle that is graphically displayed below the first circle, and each of the third type requirement unique numerical point values at spaced locations within one of a plurality of functional sector portions formed on a circumference of a third requirement type circle that is graphically displayed below the second and forms a column with the first and second circles, wherein each functional sector is determined as a function of a set of architectural principles; and
draw chords between unique numerical point values located on different ones of the first, second and third circles of requirements that are derived from a same parent system, the drawing further using any chord already existing and connecting the same functional sector portions of the different ones of the first, second and third circles.

14. The programmable device of claim 13, wherein the processing means is configured to
plot each of the requirement unique numerical point values on the first, second and third requirement type circles by:
plotting each of the first type requirement unique numerical point values at equally spaced locations along the circumference of the first requirement type circle, each of the second type requirement unique numerical point values at equally spaced locations on the circumference of the second requirement type circle, and each of the third type requirement unique numerical point values at equally spaced locations on the circumference of the third requirement type circle; and
relocating a requirement unique numerical point value from an original plotted location to a new location within another formed functional sector portion that is more appropriate to the relocated requirement, wherein the new location is a mean between two plotted points in the another formed functional sector portion.

15. The programmable device of claim 14, wherein the processing means is configured to form sectors as a function of determining a first point for the sector and a last point for the sector based on a total count of the set of requirements and a category count of a number of sections to be formed.

16. The programmable device of claim 15, wherein one of the two plotted points is an already plotted requirement unique numerical point value, and an other of the two plotted points is the first point or the last point for the another formed functional sector portion.

* * * * *